United States Patent
Bass et al.

(10) Patent No.: US 6,688,900 B2
(45) Date of Patent: Feb. 10, 2004

(54) INSULATING JOINT FOR ELECTRICALLY HEATED PIPELINE

(75) Inventors: Ronald M. Bass, Houston, TX (US); James R. Hale, Katy, TX (US); Gerald R. Douglas, Houston, TX (US)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 10/179,703

(22) Filed: Jun. 25, 2002

(65) Prior Publication Data

US 2003/0235471 A1 Dec. 25, 2003

(51) Int. Cl.$^7$ ................................................ H01R 4/60
(52) U.S. Cl. ........................................ 439/191; 439/193
(58) Field of Search ................................ 439/190, 191, 439/192, 193, 194

(56) References Cited

U.S. PATENT DOCUMENTS

| | | | |
|---|---|---|---|
| 972,308 A | 10/1910 | Williamson | |
| 1,231,202 A | 6/1917 | Saylor | |
| 2,217,857 A | 4/1937 | Byck | 166/21 |
| 2,096,279 A | 10/1937 | Karcher | 255/28 |
| 2,178,720 A | 2/1938 | Daniels | 219/47 |
| 2,206,831 A | 3/1938 | Berthelsen | 74/440 |
| 2,224,403 A | 12/1940 | Lines | 219/39 |
| 2,306,831 A | 12/1942 | Proctor | 219/39 |
| 2,660,249 A | 11/1953 | Jakosky | 166/17 |
| 2,678,377 A | 5/1954 | Justiz | 219/40 |
| 2,714,930 A | 8/1955 | Carpenter | 166/60 |
| 2,757,738 A | 8/1956 | Ritchey | 166/39 |
| 2,982,354 A | 4/1957 | Green | 166/60 |
| 2,851,197 A | 9/1958 | Colton | 222/146 |
| 3,184,958 A | 5/1965 | Eaton | 73/40.5 |
| 3,388,724 A | 6/1968 | Mowell et al. | 138/149 |
| 3,423,570 A | 1/1969 | Trabilcy | 219/301 |
| 3,432,186 A | 3/1969 | Braun | 285/53 |

(List continued on next page.)

FOREIGN PATENT DOCUMENTS

| | | | |
|---|---|---|---|
| EP | 0 162 543 | * 11/1985 | ............... 439/194 |
| EP | 1070907 | 1/2001 | |
| GB | 2084284 | 7/1982 | |
| SU | 569815 | 9/1977 | |
| WO | 103122 | 4/1937 | |
| WO | 1359445 | 4/1972 | |
| WO | 1437587 | 7/1974 | |
| WO | 1532730 | 10/1976 | |

OTHER PUBLICATIONS

"Cable–Free Electrical Systems for the Oil to Gas Industry," Production Technologies Company, L.L.C. 600 Kenrick, Suite C–30; Houston, Texas 77060, advertisement, Copyright 1996, 6 pp.

"Dunbar in Depth," Offshore Engineer, Dec. 1994, 2 pp.

"Introduction to Direct Heating of Subsea Pipelines," Overview by Statoil, Saga Petroleum, CSO Norge, Alcatel, Kabel Norge and EFI, Feb. 1988.

"Monolithic Pipeline Electrical Isolation Joints," Hydro-Tech Systems, Inc., Engineered Pipeline Products, advertisement, Nov. 1996, 6 pp.

(List continued on next page.)

*Primary Examiner*—Tho D. Ta (57) ABSTRACT

An Electrical Insulating Joint (EIJ) for a pipe-in-pipe electrically heated pipeline is provided. A ceramic disk under compressive load and dielectrics in an annulus provide electrical isolation and mechanical strength. An insulative liner extends around the ceramic disk to provide electrical isolation when materials other than hydrocarbons pass through the EIJ. The insulative liner may be extended through a knee joint. Pressure ports may be used to monitor fluid leaks and a built-in transformer may be used to monitor electrical leakage current.

17 Claims, 6 Drawing Sheets

U.S. PATENT DOCUMENTS

| | | | | |
|---|---|---|---|---|
| 3,439,075 | A | 4/1969 | Bauer et al. | 264/45 |
| 3,507,330 | A | 4/1970 | Gill | 166/248 |
| 3,515,837 | A | 6/1970 | Ando | 219/10.49 |
| 3,547,193 | A | 12/1970 | Gill | 166/248 |
| 3,556,218 | A | 1/1971 | Talley, Jr. et al. | 166/265 |
| 3,605,888 | A | 9/1971 | Crowson et al. | 166/248 |
| 3,614,986 | A | 10/1971 | Gill | 166/303 |
| 3,620,300 | A | 11/1971 | Crowson | 166/248 |
| 3,630,038 | A | 12/1971 | Ando | 61/72.1 |
| 3,642,066 | A | 2/1972 | Gill | 166/248 |
| 3,706,872 | A | 12/1972 | Trabiley | 219/300 |
| 3,859,503 | A | 1/1975 | Palone | 219/278 |
| 3,885,595 | A | 5/1975 | Gibson et al. | 138/155 |
| 3,933,031 | A | 1/1976 | Uhlarik | 73/40.5 R |
| 3,935,632 | A | 2/1976 | Maxson | 29/455 R |
| 3,944,262 | A | 3/1976 | Stiner et al. | 285/53 |
| 3,958,636 | A | 5/1976 | Perkins | 166/248 |
| 3,975,617 | A | 8/1976 | Othmer | 219/300 |
| 3,981,181 | A | 9/1976 | Ochiai | 73/40.5 R |
| 3,983,360 | A | 9/1976 | Offermann | 219/301 |
| 4,010,799 | A | 3/1977 | Kern et al. | 166/248 |
| 4,011,652 | A | 3/1977 | Black | 29/455 R |
| 4,017,102 | A | 4/1977 | Henderson | 285/41 |
| 4,140,179 | A | 2/1979 | Kasevich et al. | 166/248 |
| 4,142,093 | A | 2/1979 | Offermann | 219/301 |
| 4,319,632 | A | 3/1982 | Marr, Jr. | 166/60 |
| 4,401,162 | A | 8/1983 | Osborne | 166/248 |
| 4,450,711 | A | 5/1984 | Claude | 73/40.5 R |
| 4,496,174 | A | 1/1985 | McDonald et al. | 285/53 |
| 4,522,578 | A | 6/1985 | Martin, Jr. et al. | 425/110 |
| 4,553,023 | A | 11/1985 | Jameson et al. | 219/301 |
| 4,590,971 | A | 5/1986 | Webster et al. | 138/149 |
| 4,644,780 | A | 2/1987 | Jeter | 73/40.5 |
| 4,645,906 | A | 2/1987 | Yagnik et al. | 219/301 |
| 4,667,505 | A | 5/1987 | Sharp | 73/40.5 R |
| 4,684,786 | A | 8/1987 | Mann et al. | 219/297 |
| 4,716,960 | A | 1/1988 | Eastlund et al. | 166/60 |
| 4,768,455 | A | 9/1988 | Maxson et al. | 114/264 |
| 4,831,324 | A | 5/1989 | Asakura et al. | 324/57 R |
| 4,839,644 | A | 6/1989 | Safinya et al. | 340/854 |
| 4,861,074 | A | 8/1989 | Eastlund et al. | 285/53 |
| 4,874,925 | A | 10/1989 | Dickenson | 249/301 |
| 4,970,467 | A | 11/1990 | Burnett | 324/637 |
| 4,992,001 | A | 2/1991 | Harrison | 405/166 |
| 4,996,879 | A | 3/1991 | Kruka et al. | 73/592 |
| 5,072,622 | A | 12/1991 | Roach et al. | 73/40.5 R |
| 5,125,847 | A | * 6/1992 | Goncalves | 439/193 |
| 5,172,730 | A | 12/1992 | Driver | 138/104 |
| 5,189,374 | A | 2/1993 | Burnett | 324/534 |
| 5,270,661 | A | 12/1993 | Burnett | 324/527 |
| 3,789,188 | A | 1/1994 | Rudbarg | 219/301 |
| 5,289,561 | A | 2/1994 | Costa Filho | 392/478 |
| 5,389,003 | A | * 2/1995 | Van Steenwyk et al. | 439/191 |
| 5,421,675 | A | 6/1995 | Brown et al. | 405/170 |
| 5,464,307 | A | 11/1995 | Wilkins | 405/166 |
| 5,490,562 | A | 2/1996 | Arnold | 166/267 |
| 5,605,798 | A | 2/1997 | Koster | 435/6 |
| 5,801,953 | A | 9/1998 | Thoma et al. | 364/487 |
| 5,836,719 | A | 11/1998 | Martin et al. | 405/166 |
| 5,905,194 | A | 5/1999 | Strong | 73/40.5 |
| 6,000,438 | A | 12/1999 | Ohrn | 138/149 |
| 6,049,657 | A | 4/2000 | Sumner | 392/469 |
| 6,058,979 | A | 5/2000 | Watkins | 138/149 |
| 6,114,857 | A | 9/2000 | Kohl | 214/534 |
| 6,142,707 | A | 11/2000 | Bass et al. | 405/158 |
| 6,179,523 | B1 | 1/2001 | Langner et al. | 405/169 |
| 6,278,095 | B1 | 8/2001 | Bass et al. | 219/629 |
| 6,292,627 | B1 | 9/2001 | Gilchrist, Jr. et al. | 393/311 |
| 6,305,429 | B1 | 10/2001 | Welch et al. | 138/149 |
| 6,315,497 | B1 | 11/2001 | Wittman et al. | 405/158 |
| 6,328,583 | B2 | * 12/2001 | Ness et al. | 439/193 |
| 6,364,401 | B1 | 4/2002 | Kim | 296/194 |
| 6,371,693 | B1 | 4/2002 | Kopp et al. | 405/148 |
| 6,382,259 | B1 | 5/2002 | Codling | 138/149 |
| 6,509,557 | B1 | 1/2003 | Bass | 219/772 |
| 2003/0015436 | A1 | 1/2003 | Bass et al. | 205/740 |
| 2003/0015519 | A1 | 1/2003 | Stone, Jr. | 219/494 |
| 2003/0016028 | A1 | 1/2003 | Bass | 324/642 |
| 2003/0017007 | A1 | 1/2003 | Bass et al. | 405/154.1 |
| 2003/0020499 | A1 | 1/2003 | Bass | 324/721 |

OTHER PUBLICATIONS

"Skin Effect Pipe Heating Systems," Thermo Systems Technology, Inc. (TST), Four Commerce Park Square, 23200 Chargrin Boulevard, Suite 600, Beachwood, Ohio 44122, Copyright 1991, advertisement, 4 pp.

Stop Paraffin Build–up and Realize Your Well's Full Potential. . . Plug in Patatrol. International, Inc. (PTI), 15423 Vantage Parkway East, Houston, Texas 77032, advertisement, Copyright 1989, 6 pp.

"Tubing Casing Wireless Telemetry (Tucas System)," Schlumberger web page (1993?/Jun. 1996), 16 pp.

A. Anselmi et al., "TTDPIS: A New Underwater Technology in the Field of Traced Insulated Pipelines," 1994 OMAE, vol 5, Pipeline Technology, ASME, 1994, pp. 69–76.

Anonymous, Insulated Pipe–Precision Engineering, Jun. 2000, The Bayou Bulletin, Issue #8 from www.bayoupip-.com/4News/Newslwtter0 8–4.thm, 2 pages.

Anonymous, "Insulated Technique to see first use in North Sea Developement", May 17, 1993, Oil and Gas Journal vol. 91 Issue 20, page 61.

B. J. Eastlund et al., "New System Stops Paraffin Buildup," Petroleum Engineer, Jan. 1989, 3 pp.

Brochure–Combi Pipe–the endo of clogged pipelines, Alcatel Contracting Norway and Aker Engineering, 7 pp.

Brochure–World Wide Experience list–Compressed Gas Insulate Transmission Bus System Type CGIT, ABB Power T & D Company Inc., 30 Oak Street, Westborough, Ma 01581, USA, 6 pp. Oct. 1996.

C/ G. Langer, "Engineering Report—1979 Construction of the Cogmac 12–inch Pipeline from Mississippi Canyon Block 194 to Southwest Pass East Bay Central Facilities, Offshore Louisiana, "ES No. 74–82, Job No. 560513, Shell Oil Company, Pipeline Construction Department, *, 6 pp.

DeLuca, "Field of Dreams", Apr. 1, 2001, Offshore Engineering, form www.online.com/news/features/oe/ 20010401.Fields 0.520.asp, 9 pages.

F. Aarseth and E. Bentsen, "Heating of Pipelines, and Power Supply to Subsear Electrical Equipment," Aker Engineering a.s. A. Bjøomstad and B. Knutsen, Alcatel Contracting Norwat a.s., DOT 1995, 23 pp.

F.R. Newbold and T. K. Perkins, "Wellbore Transmission of Electrical Power," The Journal of Canadian Petroleum Technology, Jul.–Sep. 1978, Montreal, pp. 3–52.

F. G. Bosch, K.J. Schmitt, And B. J. Eastlund, "Evaluation of Downhole Electric Impedance Heating Systems for Paraffin Control," Paper No. PCIC–90–34 presented at Industry Applications Society 37th Annual Petroleum and Chemical Industry Conference, Houston, Texas, Sep. 10–12, 1990, pp. 223–227.

Fred S. Epstein and Gary L. White, "Understanding Impedance Heating," Chemical Engineering, May 1996, pp. 112–118.

Gaylord, N.G., Gaylord Associates, Newark, New Jersey, "Polymers–Part I. Polyalklene Oxides and Other Polyethers" Interscience Publishers: New York–London–Syndey, pp. 9–80, 1963.

"General Product Specification–Pipeline Insulating Joint," HydroTech Systems, Engineered Pipeline Products, advertisement, pp. 1995.

H. Collins and M.A.R. Lyle, Progress Reported in Design of Reelable Insulated Subsea Flow Lines, Oil and Gas Journal, Sept. 24, 1990. p. 102–106.

K. H. Akfhampour, "A Novel Approach to Solving Downhole Fluid Flow Problens by Use of an Electric Heating System", Paper no. PCIC–85–35, 12 pp. 1985.

Krevelen, D. W., Univ. of Technology. Delft. The Netherlands, "Properties of Polymers", 3.sup.rd Edition (Revised), Elsevier, Amsterdam–Oxford–New York–Tokyo, 1990; pp. 641–653.

M. I. Mollison, "Foam Insulation Gets First Reeled Installation off Australia," Oil andGas Journal, May 18, 1992, pp. 80–82.

N. B. Carson, "A New Method for Heat Tracing Long Pipelines," ASME, 74–Pet–35, paper presented at the Petroleum Mechanical Engineering Conference, Dallas, Texas, Sep. 15–18, 1974, pp. 2–4.

Protest Document, Dec. 8, 1987 letter of Andrew W. Marr, Jr. to the Assistant Commissioner of Patents requesting issuance of U.S. Patent 4,716,960 available in the file history as of Jan. 5, 1988.

R Walsh, "Electromagnetic Energy Helps Recovery," Gulf Coast Oil World., Jun. 1986, pp. 18–19.

"Taking Induction Heating Underwater," Process Heating, Jul./Aug. 1995, 1 p.

Anecdote–"Thermo Systems Under River Crossings" discussed in Supplemental Information Disclosure Statement filed on June 22, 2000 for U.S. Patent Application SN 08/921,737, filed Aug. 27, 1997, entitled, "Method for Maintaining Well Fluids Within a Shut–In Subsea Pipeline".

Anecdote –"Fuel Oil Between Buildings" discussed in Supplemental Information Disclosure Statement filed on June 22, 2000 for U.S. Patent Application SN 08/921,737, filed Aug. 27, 1997, entitled, "Method for Maintaining Well Fluids Within a Shut–In Subsea Pipeline".

Anecdote –"Asphalt Transfer Liner form Tank Cars et al." discussed in Supplemental Information Disclosure Statement filed on June 22, 2000 for U.S. Patent Application SN 08/921,737, filed Aug. 27, 1997, entitled, "Method for Maintaining Well Fluids Within a Shut–In Subsea Pipeline".

Production Technologies Company Invention Discosure of R. M. Bass dated Jul. 24, 1986, "Disclosure for Controlled Paraffin Deposition in Subsea Pipelines" as discussed in Supplemental Information Disclosure Statement filed on Jun. 22, 2000 for U.S. Patent Application S/N No. 08/921, 737, filed Aug. 27, 1997, entitled "Method for Maintinaing Well Fluids Within a Shut–In Subsea Pipeline".

Purported Invention Disclosure of Production Technologies Company, L.L.C. (PTC) by Bernard J Eastlund and John Haeber, dated Apr. 28, 1995. "Apparatus for Introducing Electric Current into and Offshore Pipeline." 4 pp. as discussed in Supplemental Information Disclosure Statement filed on Jun. 22, 2000 for U.S. Patent Application S/N No. 08/921,737, filed Aug. 27, 1997, entitled "Method for Maintinaing Well Fluids Within a Shut–In Subsea Pipeline".

* cited by examiner

INSULATING JOINT FOR ELECTRICALLY HEATED PIPELINE

BACKGROUND OF THE INVENTION

1. Field of the Invention

This invention pertains to subsea pipelines. More particularly, apparatus is provided for electrically insulating and connecting electrical power to a segment of a pipeline that is electrically heated using a pipe-in-pipe configuration.

2. Description of Related Art

Offshore hydrocarbon recovery operations are increasingly moving into deeper water and more remote locations. Often satellite wells are completed at the sea floor and are tied to remote platforms or other facilities through extended subsea pipelines. Some of these pipelines extend through water that is thousands of feet deep and where temperatures of the water near the sea floor are in the range of 40° F. The hydrocarbon fluids, usually produced along with some water, reach the sea floor at much higher temperatures, characteristic of depths thousands of feet below the sea floor. When the hydrocarbon fluids and any water present begin to cool, phenomena occur that may significantly affect flow of the fluids through the pipelines. At these low temperatures, some crude oils become very viscous or deposit paraffin. Either phenomenon can prevent flow. Hydrocarbon gas under pressure (free gas or solution gas in crude oil) can combine with water at reduced temperatures to form a solid ice-like material, called a "hydrate." Hydrates can plug pipelines and the plugs are very difficult to remove. In deep water, conventional methods of depressuring the flow line to remove a hydrate plug may not be effective. Higher pressures in the line and uneven sea floor topography may cause excessive time requirements for remediation, which can be costly in terms of lost production.

The problem of lower temperatures in subsea pipelines has been addressed by placing thermal insulation on the lines, but the length of some pipelines makes thermal insulation alone ineffective. Increased flow rate through the lines also helps to minimize temperature loss of the fluids, but flow rate varies and is determined by other factors. Problems of heat loss from a pipeline increase late in the life of a hydrocarbon reservoir because production rates often decline at that time. Problems become particularly acute when a pipeline must be shut-in for an extended period of time. This may occur, for example, because of work on the wells or on facilities receiving fluids from the pipeline. The cost of thermal insulation alone to prevent excessive cooling of the lines becomes prohibitive under these conditions.

Heating of pipelines by bundling the lines with a separate pipeline that can be heated by circulation of hot fluids has been long practiced in the industry. Also, heating by a variety of electrical methods has been known. Most of the proposals for electrical heating of pipelines have related to pipelines on land, but in recent years industry has investigated a variety of methods for electrical heating of subsea pipelines. ("Direct Impedance Heating of Deepwater Flowlines," OTC 11037, May, 1999)

Two configurations for electrical heating have been considered. In one configuration, a single flowline is electrically insulated and current flows along the flowline. This is called the "SHIP" system (Single Heated Insulated Pipe). In the second configuration for electrical heating, a pipe-in-pipe subsea pipeline is provided by which a flow line for transporting well fluids is the inner pipe and it is surrounded concentrically by and electrically insulated from an electrically conductive outer pipe until the two pipes are electrically connected at one end. Voltage is applied between the inner and outer pipes at the opposite end and electrical current flows along the exterior surface of the inner pipe and along the interior surface of the outer pipe. This pipe-in-pipe method of heating is disclosed, for example, in U.S. Pat. No. 6,142,707, which is commonly assigned and hereby incorporated by reference herein. Other patents related to the pipe-in-pipe method of heating include U.S. Pat. No. 6,292,627 B1 and U.S. Pat. No. 6,371,693 B1, which are hereby incorporated by reference.

Any method of electrical heating of a segment of a pipeline requires that the segment be electrically insulated from other parts of the pipeline. The pipe-in-pipe method of heating disclosed in the referenced patents requires, when power is applied at one end of the segment to be heated, an Electrical Insulating Joint (herein "EIJ") at the powered end of the segment. The powered end is normally on or attached to an offshore platform or other structure where electrical power is generated. The voltage drop across the EIJ determines the amount of heating available and the length of a segment that can be heated; for a pipeline a few miles long a voltage drop of thousands of volts is expected. Electrical currents through the pipeline may be in the range of hundreds of amperes.

subsea pipeline may contain, along with hydrocarbons, water, grease, pipe dope, well treating chemicals, inhibitors or other contaminants and, from time-to-time, even metallic parts from subsurface equipment such as sand screens or chokes. Water may condense above the EIJ as fluids in the heated segment cool. Therefore, there is need for an electrical insulating joint that can maintain electrical isolation even in the presence of harsh chemical and mechanical environments. The insulating joint should be able to survive repeated exposure to all these materials without failing electrically or reducing the heating capability of the system. The primary protection should be passive, i.e., not dependent on instrumentation, but instrumentation may be used for monitoring. The device should also be capable of transmitting the large static loads of a subsea pipeline riser that is tied to the structure. Under no circumstances should there be a pressure release or exposure of an ignition source.

SUMMARY OF THE INVENTION

Apparatus is provided for applying electrical power to a pipe-in-pipe heated pipeline. An Electrical Insulating Joint (EIJ) provides mechanical joining, pressure containment and electrical isolation of a heated and an unheated portion. A ceramic ring under compression and dielectrics in the annulus separate inner and outer pipe hubs. A dielectric liner is placed over the ceramic ring and the wall of the flow channel for a selected distance in each direction from the ceramic ring. Additional lined piping (e.g., a knee joint) may be used to extend this distance above the ceramic ring and to place the EIJ at a selected angle with respect to vertical. An additional ceramic ring may be placed between shoulders in the EIJ. O-ring seals may be placed on the ceramic ring and in the annulus dielectrics. Pressure ports may be placed so as to indicate pressure build-up across an o-ring or other seal. A transformer may be placed so as to indicate electrical leakage current along the liner.

DETAILED DESCRIPTION

Figure 1:
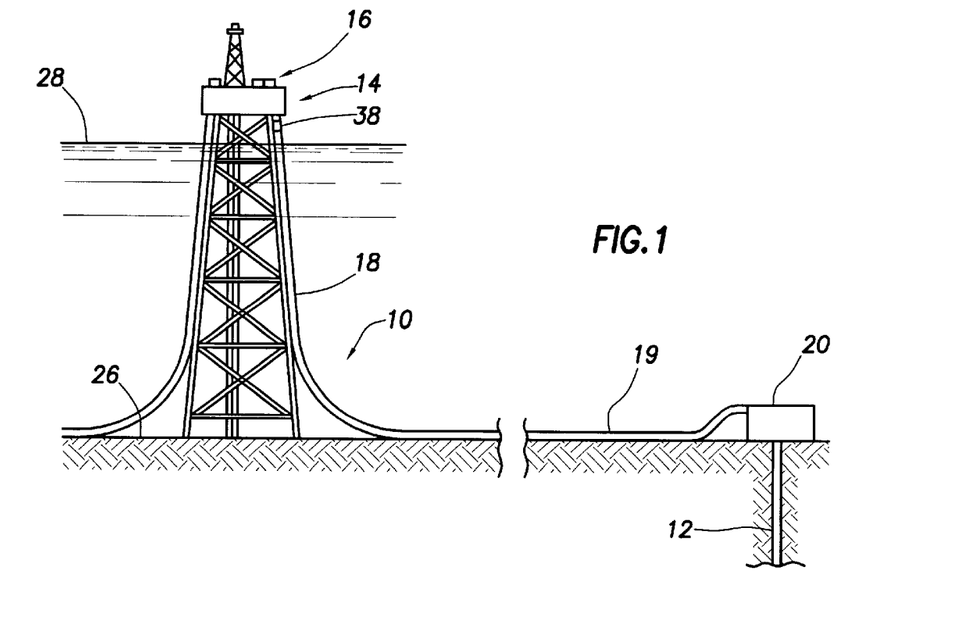
FIG. 1 shows a view of apparatus for heating a riser and a segment of a pipe-in-pipe pipeline near an offshore platform.

Referring to FIG. 1, the environment of use of an Electrical Insulating Joint (EIJ) is illustrated. Here remote satellite well 12 is connected to platform 14 with subsea pipe-in-pipe pipeline 10. Subsea pipeline 10 may consist of seafloor section 19 and riser 18. Electrical Insulating Joint 38 is placed in riser 18, whereby electrical power is supplied to riser 18 and seafloor section 19. Surface facilities 16 on platform 14 include an electrical power supply. Seafloor section 19 may be up to 20 or more miles long. Pipe-in-pipe flowline 10 may be composed of 40-ft joints of pipe welded together. It is common to form individual 160 ft segments of pipe, called quads (four joints), which are then welded together as they are placed subsea to form pipe-in-pipe flowline 10. Seafloor section 19, which may be a half-mile or more below surface 28 of the ocean, may terminate at sled 20, where the outer pipe and inner pipe of the pipeline are electrically connected by a bulkhead or other apparatus on sled 20.

Figure 2:
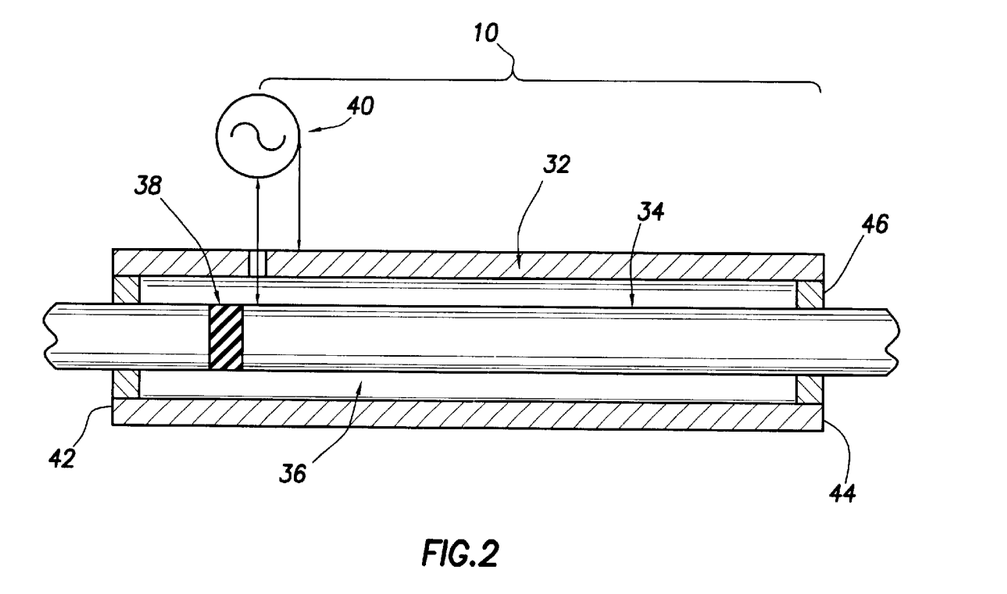
FIG. 2 shows a schematic cross-section of a pipe-in-pipe electrical heating apparatus.

FIG. 2 illustrates one embodiment of an electrically heated pipe-in-pipe pipeline. In the embodiment shown in FIG. 2, pipeline 10 includes electrically conductive outer pipe 32 and electrically conductive product flowline or inner pipe segment 34 arranged concentrically. Annulus 36 is defined between inner pipe segment 34 and outer pipe 32. Electrical Insulating Joint (EIJ) 38, which is normally in proximity to platform 14, structurally joins and electrically insulates heated segment 34 of inner pipe from outer pipe 32 and from inner pipe in an unheated segment. The structural connection in FIG. 2 is illustrated by a bulkhead in proximity to electrical insulation in inner pipe 34. Electrical power supply 40 is connected across inner pipe 34 and outer pipe 32 at the end of a segment of the pipeline to be heated. Thus the heated segment of pipe-in-pipe flowline 10 serves as a power transmission line, with the circuit completed by an electrical pathway connecting inner pipe 34 and outer pipe 32 at a second end 44 of the pipeline, which is normally in proximity to sled 20 (FIG. 1). By transmitting power, the entire heated segment of pipeline 10 serves as an electrical heater. The connection for joining the inner and outer pipes may be provided by electrically conductive bulkhead 46 (FIG. 2). To prevent electrical shorts across annulus 36, inner pipe 34 must be electrically isolated from outer pipe 32 along the entire length of heated segment 10 except at bulkhead 46.

Figure 3:
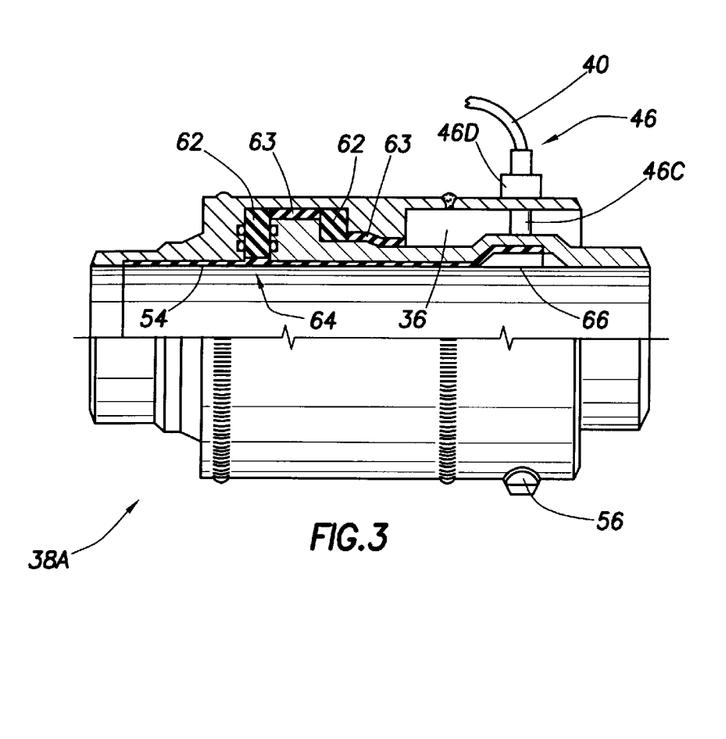
FIG. 3 shows a partial cross-section of a prior art insulating joint.

A prior art EIJ, disclosed in U.S. Pat. No. 6,142,707, is illustrated in FIG. 3. EIJ 38A includes annular rings 62 to isolate the inner and outer pipes. Annular rings 62 may be formed from epoxy or zirconia. Other annular spaces 63 within EIJ 38 are filled with similar high-strength electrically insulating materials. According to this patent, liner 54 is bonded over each side of insulator interface 64 to prevent electrical breakdown due to brine in the well fluids. Electrical terminal 46 is connected to the inner pipe by penetrator 46C, which passes through port 46D. Liner 54 terminates in swage ring liner termination 66.

Figure 4:
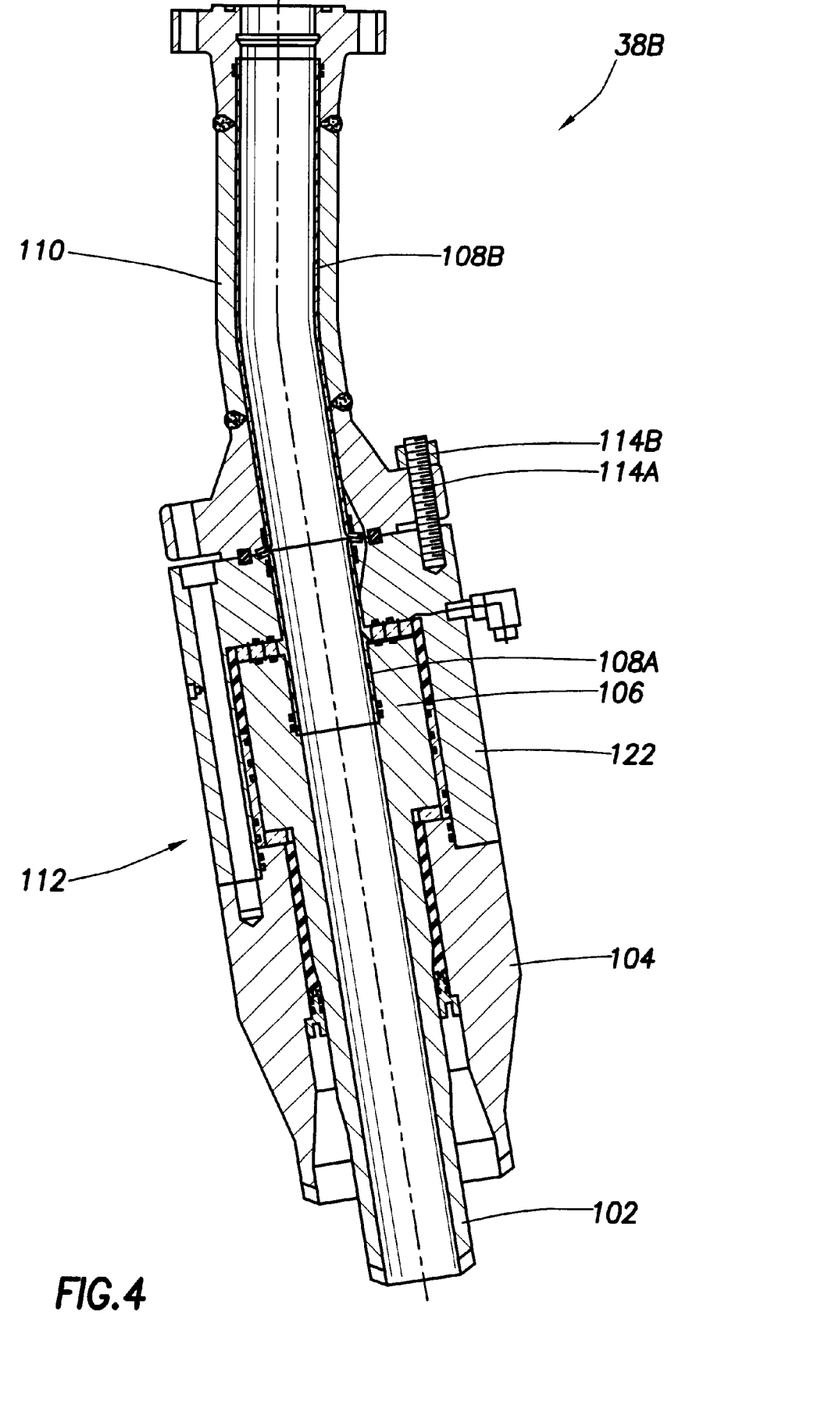
FIG. 4 shows a composite cross-section view of the electrical insulating joint disclosed herein.

Referring to FIG. 4, EIJ 38B, disclosed herein, is illustrated. Inner pipe connector 102 is connected to the inner pipe of a segment of pipe-in-pipe electrically heated pipeline. Outer pipe hub 104 is connected to the outer pipe of the segment. Inner pipe hub 106 forms the end of the inner pipe and forms an end surface for sealing and applying a compressive joining force. Knee joint 110 may be joined to body 112 of the EIJ by bolts 114A and nuts 114B. Insulative liners 108A and 108B extend through at least a portion of knee joint 110 and at least partially through body 112 of the EIJ. Preferably, the liners are installed such that the inside surface is flush with the remaining flow channel through the EIJ, as shown. Liner 108A preferably includes an increased outside radius where the liner contacts dielectric ring 126. The purpose of the increased outside radius is twofold: (1) to increase thermal isolation between the inside surface of the liner, where high-temperature arcing may occur, and dielectric ring 126; and (2) to provide additional sealing capability to protect against contamination behind liner 108A. The additional sealing is realized by plastic deformation of the liner material 108A between the steel components 106 and 122.

Liner 108, consisting of liner 108A and 108B, is electrically insulative, should maintain dimensional stability in the presence of fluids passing through the EIJ, should have high damage resistance after repeated arcing and aging, should have high dielectric strength after repeated arcing and aging, should be hydrophobic to minimize continuous water tracks along the liner, should have a temperature rating of at least 200° F., and preferably should be flexible enough to allow flaring of the ends of the liner to enable sealing at a flange, as shown in FIG. 4 where liner pieces 108A and 108B join. The liner material should also have a high tracking-path resistance after water arcing and contaminant degradation. These properties will prevent thermal degradation of the liner or excessive power loss. Preferably, liner 108 is formed from PVDF (polyvinylidine fluoride), which is sold by ATOFINA Chemicals of Philadelphia, Pa. Nylon 11 or other insulative polymers may also be used.

Figure 5:
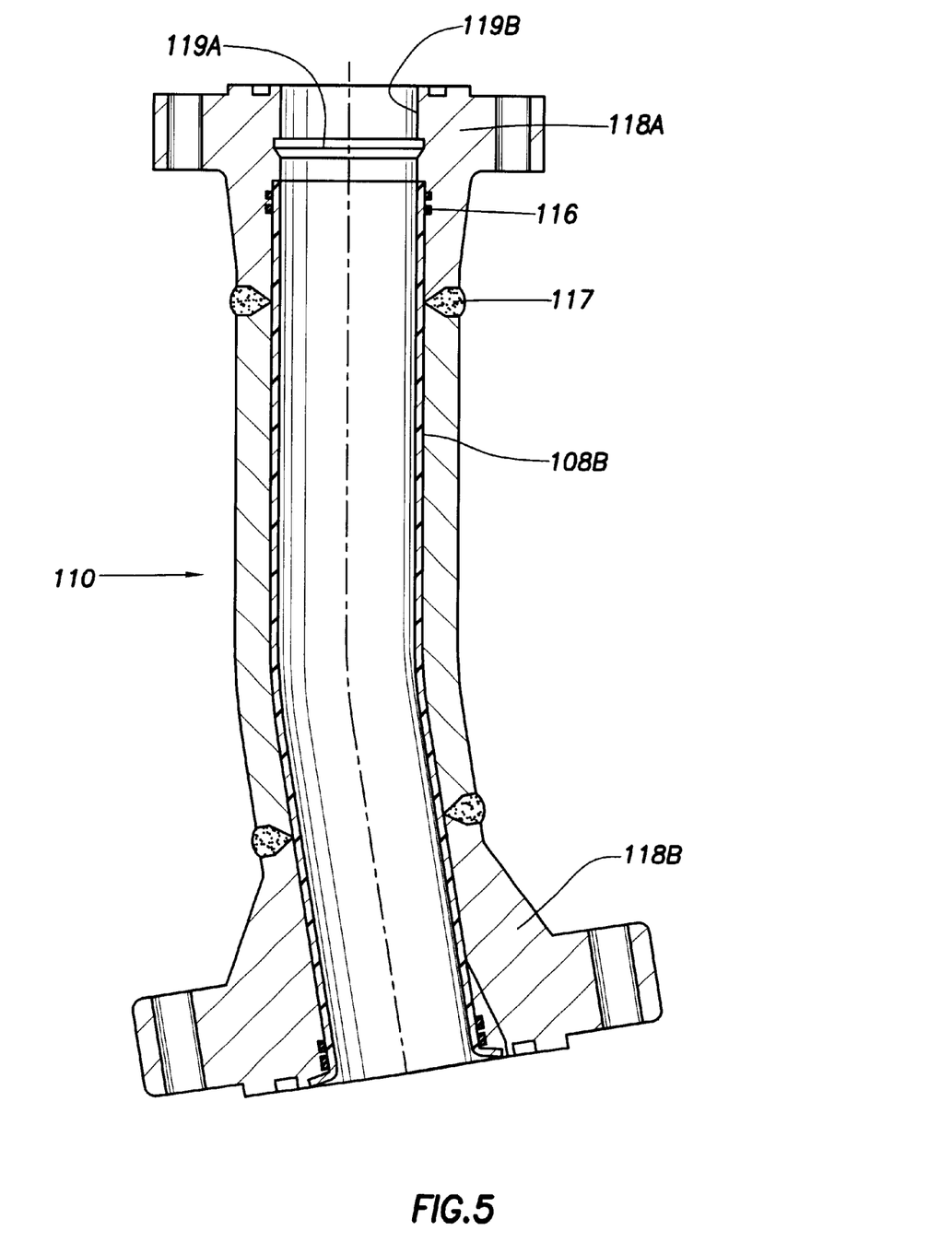
FIG. 5 is a cross-section view of the knee-joint portion of the electrical insulating joint disclosed herein.

FIG. 5 illustrates knee joint 110 in more detail. Weldments 117 are used to attach flanges 118A and 118B to the ends of the joint. Flanges 118 may be ordinary API flanges. Liner 108B is preferably about 0.25 inch thick and is selected to have a length inside joint 110 that decreases voltage gradient from the end of inner pipe hub 106 to the end of the liner to a value that will limit arc energy per unit length below a value that can cause failure of the polymer. Preferably, liner 108, consisting of parts 108A and 108B, will have a length greater than 12 inches, and more preferably, will have a length in the range from 24 to 48 inches, but may have a greater length.

Additional electrical insulation between fluids passing through knee joint 110 and the metal wall of the joint may be provided by drip ring 119A and coating 119B. Coating 119B may be an epoxy selected for high thermal and electrical properties. Coating 119B may extend under liner 108. Drip ring 119A has a contour selected to break-up a stream of water that is flowing along coating 119B, so as to prevent a continuous water phase that could short from the end of inner pipe hub 106. The material of liner 108 should also be selected to be hydrophobic, so as to aid in preventing continuous water flow along the inside surface of the liner.

O-rings 116 may be placed near the ends of liner 108B so as to assist in sealing the annulus between liner 108B and the inside wall of knee joint 110. Preferably, a hydrophobic, electrically insulating grease will be applied to the inside wall before liner 108B and 108A are installed. A suitable grease is a polyurea grease that was developed for high-voltage electric motors, such as Shell—Dolium or Texaco—Polystar.

A slight bend in knee joint 110 is usually preferable, the bend angle being selected depending on the angle from vertical of the riser at the location where the EIJ is to be installed. For example, the bend angle may be 9 degrees.

Figure 6:
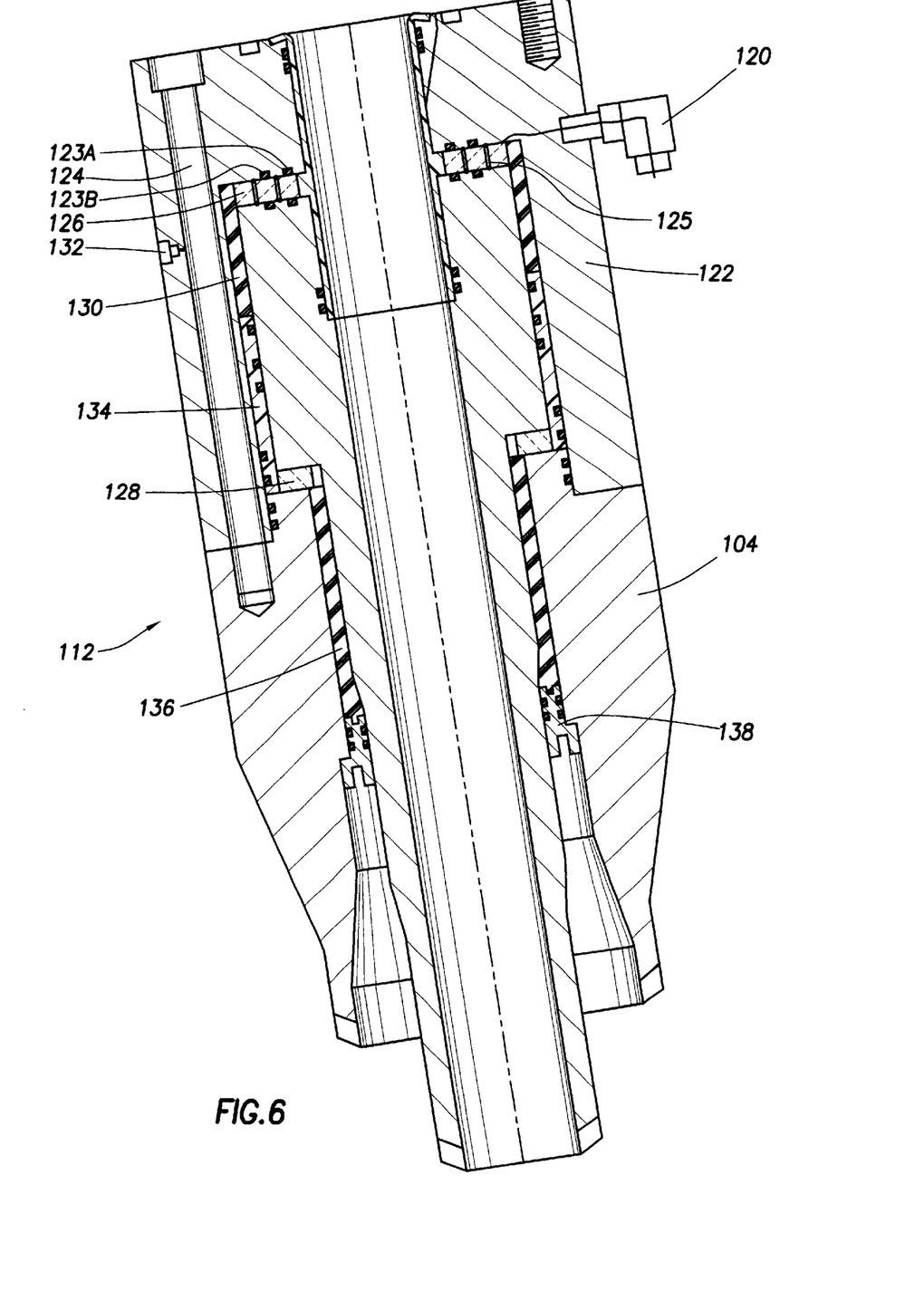
FIG. 6 is a cross-section view of the body of the electrical insulating joint disclosed herein.

Referring to FIG. 6, body 112 of the EIJ is shown. Retainer flange 122 is joined to outer pipe hub 104 by bolts in boltholes 124. Typically, 12 bolts of 1 ⅜ inch diameter with cap heads are used. The bolts are used to pre-load insulating rings 126 and 128 to a compressive load, preferably a load of about 1 million pounds. Insulating ring 126 is loaded between the end surface of inner pipe hub 106 and the interior end surface of retainer flange 122. Insulating rings 126 and 128 are preferably formed from zirconia. Ring 126 may have a thickness of about 1 inch. The annulus between the inner and outer pipe is filled with dielectric material. DELRIN ring 134 may be placed in the annulus before assembly. The DELRIN ring may include o-ring grooves as shown. If the O-ring seals on the upper ceramic rings should fail due to overheating or other cause, or cracks develop in the upper ceramic ring, gas pressure or even liquids can be communicated from the flowline to the EIJ annulus across the ceramic face. To prevent communication of this pressure to the pipe annulus, DELRIN ring 134 and associated o-rings are provided in the lower annulus of the EIJ. The DELRIN ring preferably contains o-ring grooves on both the inside and outside surfaces of the ring. Other dielectric materials may be used in place of DELRIN.

Silicone rubber 130 and 136 is preferably injected into the annulus, using ports such as port 132 and other ports opposite the point of injection to allow evacuation of the annulus before rubber injection. Pressure ports 125 may be used for monitoring pressure outside o-rings 123A and 123B. A port outside o-ring 123A can be used to indicate failure of that seal, independently of the state of the seal provided by o-ring 123B. Retainer flange 138 is used to confine dielectric 136 to the annulus.

Figure 7:
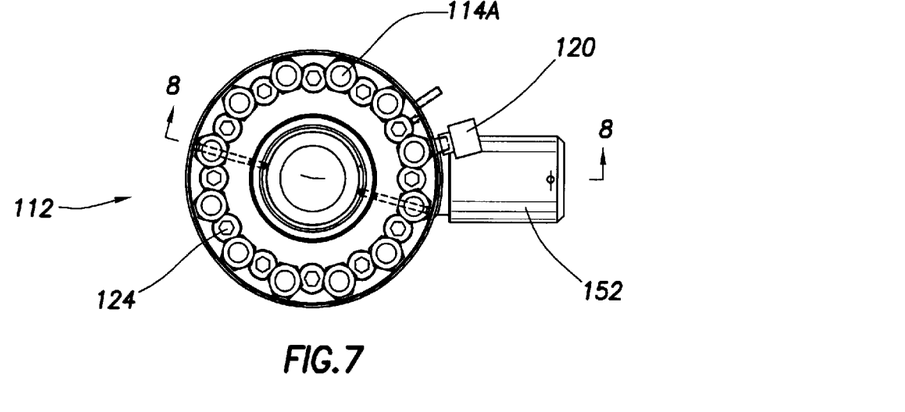
FIG. 7 is an end view of the body of the electrical insulating joint disclosed herein.
Figure 8:
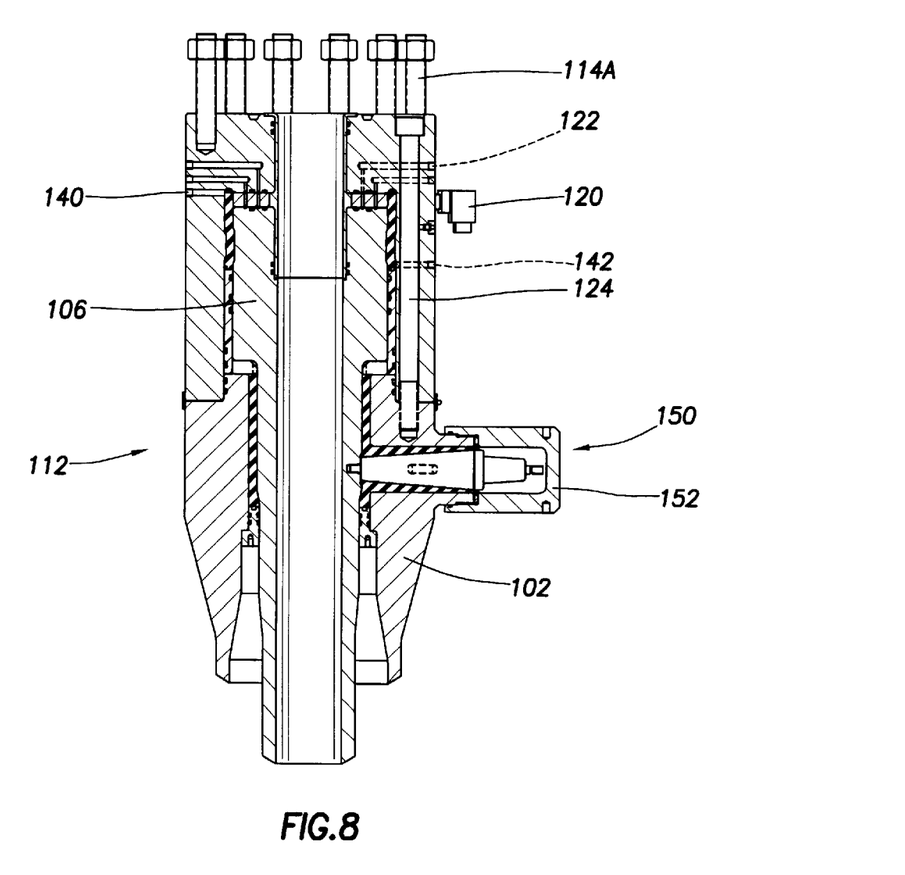
FIG. 8 is the cross-section view of the body of the electrical insulating joint disclosed herein through the angle showing the electrical input connection.

Referring to FIG. 7, an end view of body 112 is shown with bolts 114A and bolt holes 124. Cap 152 for an electrical power connection is shown along with connector 120 for signal transmission of current transformer measurements. Cross-section 8—8, is indicated. FIG. 8 shows cross-section 8—8 of body 112, which is in the plane of electrical input connection 150. Cap 152 is removed after the EIJ is installed and electrical power is to be connected. For example, 300 amperes at 2000 volts may be applied at connector 150. Pressure may be monitored behind seals to the annulus at ports 122. In fact, all ports can be manifolded using separate piping and monitored.

Figure 9:
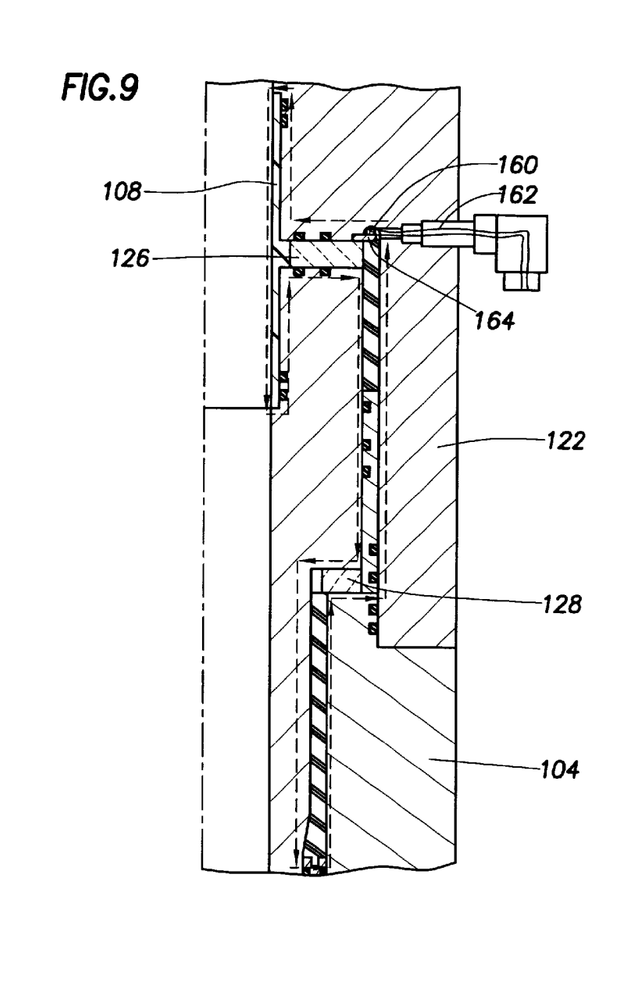
FIG. 9 is a schematic cross-section view of the electrical transformer disclosed herein and flow of leakage current.

FIG. 9 illustrates method and apparatus for monitoring electrical leakage current that may occur along the surface of liner 108 in EIJ 38B. A transformer, consisting of core 160 and winding 162, may be inserted in retainer flange 122 above the point where heating current flows and below the top of liner 108. Any leakage current flowing on the inside surface of liner 108 will then complete a circuit as illustrated by the dotted lines in FIG. 9. Due to the skin effect and proximity effect, current flow (AC) will occur along the outside surface of inside concentric conductors and along the inside surface of outside concentric conductors and, in general, along the surface of all carbon steel conductors in the current leakage path. The leakage current through the steel then flows outside transformer core 160 and winding 162, allowing leakage current along the liner, which is inside the transformer core, to be detected.

Transformer core 160 may be formed from SUPERALLOY, such as 81% nickel and 14% silicon steel, with 12 layers, each having a thickness of about 0.014 inch, available from Magnetic Metals of Anaheim, Calif. The core may be tack welded and heat treated according to manufacturer's specifications. Conductor wire 162 is preferably toroidally wound on the core. The wire may be wrapped around core 160 to form a cross-section about 0.125 by 0.18 inch, consisting of two windings of about 1000 turns each. One of the windings is redundant and can be energized to test the other. The diameter of the transformer ring may be about 12 inches. The transformer may be held in place by ring 164, which is a thin, continuous ring that serves primarily as a shield from electrical and magnetic fields arising from the heating current, but also serves as a retainer for the transformer.

While particular embodiments of the present invention have been described, it is not intended that these details should be regarded as limitations on the present invention, except as to the extent that they are included in the appended claims. It should be understood that various changes, substitutions and alterations can be made hereto without departing from the spirit and scope of the invention as defined by the appended claims.

What is claimed is:

1. An electrical insulating joint for an electrically heated pipe-in-pipe pipeline, comprising:
   an inner pipe hub adapted for joining to an inner pipe of the pipe-in-pipe pipeline and having an end surface and a flow channel therethrough;
   an outer pipe hub adapted for joining to an outer pipe of the pipe-in-pipe pipeline;
   a retainer flange, the retainer flange being mechanically and electrically joined to the outer pipe hub and having a flow channel therethrough and being adapted to align the flow channel with the flow channel through the inner pipe hub, and having an interior end surface;
   a ceramic ring disposed between the interior end surface of the retainer flange and the end surface of the inner pipe hub;
   a dielectric material in an annulus between the inner pipe hub and the outer pipe hub and the retainer flange; and
   an electrically insulative liner in at least a segment of the flow channel of the inner pipe hub and at least a segment of the flow channel of the retaining flange.

2. The electrical insulating joint of claim 1 wherein the ceramic ring is made of zirconia.

3. The electrical insulating joint of claim 1 further comprising a second ceramic ring, the second ceramic ring being disposed between a shoulder on the inner pipe hub and a shoulder on the outer pipe hub.

4. The electrical insulating joint of claim 1 wherein the dielectric material is selected from the group of dielectric materials consisting of DELRIN, NYLON, and silicone rubber.

5. The electrical insulating joint of claim 1 wherein the liner is formed of a material selected from the group of materials consisting of polyvinylidine fluoride and NYLON.

6. The electrical insulating joint of claim 1 further comprising an o-ring disposed outside the liner and in proximity to an end of the liner.

7. The electrical insulating joint of claim 1 further comprising a transformer disposed to detect electrical leakage current along the liner.

8. A system for electrically heating a segment of a pipeline, comprising:

a pipe-in-pipe pipeline, comprising an electrically conductive outer pipe and an electrically conductive inner pipe arranged concentrically in the segment, an electrically insulated annulus being defined between the inner and outer pipes;

an electrical insulating joint at a first end of the segment, the electrical insulating joint being the electrical insulating joint of claim 1;

an electrical connection between the outer pipe and the inner pipe at a second end of the segment; and an electrical power input at the insulating joint.

9. The electrical insulating joint of claim 1 further comprising an o-ring disposed to contact an upper and a lower surface of the ceramic ring at a selected radius on the upper and the lower surface.

10. The electrical insulating joint of claim 9 further comprising a pressure port outside the selected radius.

11. The electrical insulating joint of claim 1 further comprising a knee joint joined to the retainer flange, the knee joint having a flow channel therethrough, the flow channel being aligned with the flow channel through the retainer flange, and an electrically insulative liner in at least a segment of the flow channel of the knee joint.

12. The electrical insulating joint of claim 11 wherein the flow channel bends at a selected angle.

13. The electrical insulating joint of claim 11 wherein the liner is formed of a material selected from the group of materials consisting of polyvinylidine fluoride and NYLON.

14. The electrical insulating joint of claim 11 wherein the knee joint further comprises a drip edge in the flow channel, the drip edge being coated with an electrically insulative coating extending at least to the electrically insulative liner.

15. The electrical insulating joint of claim 11 further comprising an o-ring disposed outside the liner and in proximity to an end of the liner.

16. The electrical insulating joint of claim 11 further comprising a transformer disposed to detect electrical leakage current along the liner.

17. A system for electrically heating a segment of a pipeline, comprising:

a pipe-in-pipe pipeline, comprising an electrically conductive outer pipe and an electrically conductive inner pipe arranged concentrically in the segment, an electrically insulated annulus being defined between the inner and outer pipes;

an electrical insulating joint at a first end of the segment, the electrical insulating joint being the electrical insulating joint of claim 11;

an electrical connection between the outer pipe and the inner pipe at a second end of the segment; and an electrical power input at the insulating joint.

* * * * *